United States Patent
Chen et al.

(10) Patent No.: US 11,650,077 B2
(45) Date of Patent: May 16, 2023

(54) STRICT REVERSE NAVIGATION METHOD FOR OPTIMAL ESTIMATION OF FINE ALIGNMENT

(71) Applicant: SOUTHEAST UNIVERSITY, Nanjing (CN)

(72) Inventors: Xiyuan Chen, Nanjing (CN); Xin Shao, Nanjing (CN); Xinhua Tang, Nanjing (CN); Xuefen Zhu, Nanjing (CN); Xiaosu Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 202 days.

(21) Appl. No.: 17/289,737

(22) PCT Filed: Dec. 2, 2020

(86) PCT No.: PCT/CN2020/133415
§ 371 (c)(1),
(2) Date: Apr. 29, 2021

(87) PCT Pub. No.: WO2021/110055
PCT Pub. Date: Jun. 10, 2021

(65) Prior Publication Data
US 2022/0048510 A1 Feb. 17, 2022

(30) Foreign Application Priority Data

Dec. 2, 2019 (CN) .......................... 201911214033.5

(51) Int. Cl.
*G01C 25/00* (2006.01)
*B60W 30/18* (2012.01)
(Continued)

(52) U.S. Cl.
CPC ..... *G01C 25/005* (2013.01); *B60W 30/18018* (2013.01); *G01C 21/188* (2020.08); *G06F 17/16* (2013.01); *G06F 17/175* (2013.01)

(58) Field of Classification Search
CPC .............. G01C 25/005; G01C 21/188; B60W 30/18018; G06F 17/16; G06F 17/175
See application file for complete search history.

(56) References Cited

U.S. PATENT DOCUMENTS

| 2007/0006472 A1* | 1/2007 | Bauch | ..................... G01C 17/00 33/355 R |
| 2018/0111021 A1* | 4/2018 | Matsumoto | ............. A61B 5/107 |

FOREIGN PATENT DOCUMENTS

CN 111024065 A 4/2020

OTHER PUBLICATIONS

Wang W, Chen X. Application of Improved 5th-Cubature Kalman Filter in Initial Strapdown Inertial Navigation System Alignment for Large Misalignment Angles. Sensors. 2018; 18(2):659. (Year: 2018).*
Wei Gao, et al., Rapid Fine Strapdown INS Alignment Method under Marine Mooring Condition, IEEE Transactions on Aerospace and Electronic Systems, 2011, pp. 2887-2896, vol. 47 No. 4.
Li Bin, et al., Fast Backtracking Scheme for Alignment with Strict Reverse Process Based on SINS, Navigation and Control, 2018, pp. 49-53, vol. 17 No. 5.

(Continued)

*Primary Examiner* — Kyle R Quigley
*Assistant Examiner* — Aeysha N Sultana
(74) *Attorney, Agent, or Firm* — Bayramoglu Law Offices LLC

(57) ABSTRACT

A strict reverse navigation method for optimal estimation of fine alignment is provided. The strict reverse navigation method including: establishing an adaptive control function; performing a forward navigation calculation process; performing a reverse navigation calculation process; and performing the adaptive control for a number of forward and reverse calculations. The strict reverse navigation method shortens an alignment time for the optimal estimation of fine alignment while ensuring an alignment accuracy. The strict reverse navigation method provided effectively solves a (Continued)

problem that an error of an initial value of filtering in an initial stage of the optimal estimation of fine alignment affects convergence speeds of subsequent stages. In the initial stage, a larger number of the forward and reverse navigation calculations are adopted to reduce an error of the initial value as much as possible and increase a convergence speed of the filtering.

3 Claims, 1 Drawing Sheet

(51) Int. Cl.
      *G06F 17/16*       (2006.01)
      *G06F 17/17*       (2006.01)
      *G01C 21/16*       (2006.01)

(56) References Cited

OTHER PUBLICATIONS

Li Jing-Shu, et al., Backtracking scheme for alignment with strict reverse process based on compass, Systems Engineering and Electronics, 2014, pp. 348-353, vol. 36 No 2.
Jiang Xin, et al., Applications of Forward and Reverse Filtering Algorithm to INS/GPS Integrated Navigation System, Piezoelectrics & Acoustooptics, 2017, pp. 273-276, vol. 39 No. 2.
Yan Gongmin, et al., On Reverse Navigation Algorithm and its Application to SINS Gyro-compass in-movement Alignment, Proceedings of the 27th Chinese Control Conference, 2008, pp. 724-729.

* cited by examiner

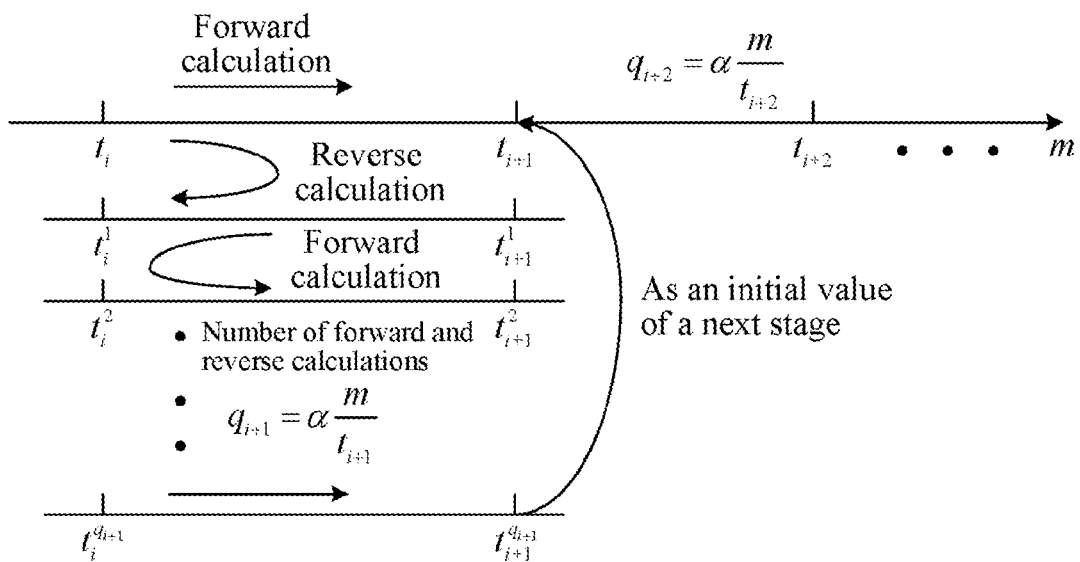

US 11,650,077 B2

STRICT REVERSE NAVIGATION METHOD FOR OPTIMAL ESTIMATION OF FINE ALIGNMENT

CROSS REFERENCE TO THE RELATED APPLICATIONS

This application is the national stage entry of International Application No. PCT/CN2020/133415, filed on Dec. 2, 2020, which is based upon and claims priority to Chinese Patent Application No. 201911214033.5, filed on Dec. 2, 2019, the entire contents of which are incorporated herein by reference.

TECHNICAL FIELD

The present invention relates to the field of navigation technologies, and in particular, to a strict reverse navigation method for optimal estimation of fine alignment.

BACKGROUND

A general navigation calculation process is a process in which data sampled by a gyroscope and an accelerometer in a strap-down inertial navigation system is processed in sequence as a set of time series. The process is performed in real time, and storage of data is not required in the process. With the continuous development of contemporary computer technologies, data storage capabilities and computing capabilities of computers have been greatly improved. Data sampled in the entire navigation process may be stored. In addition to conventional forward operations, the stored data may also be processed in a reverse chronological order. In a navigation scene without real-time requirements, repeated forward and reverse analysis and calculations of the stored data are beneficial to improvement of a navigation accuracy. In this process, in order to simplify the calculation, a small-angle approximation is often adopted for an angular speed of reverse rotation when a posture matrix is reversely updated. As a result, errors of each iteration are accumulated. When there is a small number of forward and reverse calculations, an approximation error has basically no effect on the result. When the number of forward and reverse calculations is larger and reaches a certain number of times, errors of the repeated calculations are to be increased to the same multiple as the number of times, resulting in convergent oscillation and even failure of convergence of the result due to drifting, which ultimately affects the accuracy of navigation and alignment. The strict reverse process adopts a strict reverse derivation process. There is no small-angle approximation and the solution is accurate. Repeated forward and reverse calculations can still ensure an accuracy, avoid the accumulation of approximation errors, and achieve rapid convergence of high-precision alignment, but the amount of calculations is larger than that of an ordinary reverse process.

Before performing normal navigation, the strap-down inertial navigation system needs to establish an initial value of a strap-down matrix to complete an initial alignment process of a system. When the system is in a static state, the initial alignment process is relatively easy to achieve. However, for the field of water surface and underwater navigation, the initial alignment process is to interfered by various external conditions, which does not conform to alignment conditions of a static base, and generally requires auxiliary information provided by other devices to complete initial alignment of a moving base. A prerequisite for the initial alignment research is to establish a reasonable strap-down inertial navigation system error model. In general, the initial alignment error model is essentially a set of non-linear equations. In a traditional process of initial alignment error modelling with a small misalignment angle, linearized approximation is performed on a non-linear model, then the linear error model is established with the small misalignment angle on this basis, and an optimal estimation value is given by using a Kalman filter. This process is common optimal estimation of alignment. The optimal estimation method through the Kalman filter is currently a typical method adapted to the optimal estimation method of fine alignment. According to the currently available information, reverse navigation algorithms are mostly used in compass alignment scenarios. The greatest advantage of compass alignment is a small number of calculations and allows enough forward and reverse iterations, but requires a relatively long alignment time. However, a larger number of calculations is required for the optimal estimation of alignment.

SUMMARY

In order to solve the above problems, the present invention provides a strict reverse navigation calculation method with process control, which is expected to reduce an error of an initial value of optimal estimation of fine alignment, accelerate subsequent alignment, save an alignment time, and reduce an amount of calculations as much as possible. According to the method of the present invention, adaptive control is performed on a number of forward and reverse navigation calculations in different time periods in the alignment process.

To achieve the foregoing objective, the present invention provides the following technical solutions:

A strict reverse navigation method for optimal estimation of fine alignment, including the following steps.

Step 1: Establish an Adaptive Control Function.

A total sampling time is denoted as m, time periods in a sampling process are denoted as a sequence $t_1, t_2, t_3, \ldots$, a number of forward and reverse calculations in each of the time periods is denoted as $q_1, q_2, q_3, \ldots$, and an expression of the control function is denoted as:

$$q_i = \alpha \frac{m}{t_i}, i \in [1, k]$$

where $\alpha$ is a control coefficient for a number of times.

Step 2: Perform a Forward Navigation Calculation Process.

A forward navigation process includes updating a posture, a speed, and a position, and specifically:

an earth-centered inertial coordinate system is denoted as a system i, a terrestrial coordinate system is denoted as a system e, an east, north, up (ENU) coordinate system is selected as a navigation coordinate system and is denoted as a system n, and a vehicle coordinate system is denoted as a system b.

A forward posture updating process is:

$C_{bk}{}^n = C_{bk-1}{}^n (I + T_s \Omega_{nbk}{}^b)$, where $C_b{}^n$ is a posture matrix, $T_s$ is a sampling period of a strap-down inertial navigation system, $\Omega_{nbk}{}^b = (\cap_{nbk}{}^n \times)$, where ($\bullet \times$) represents an antisymmetric matrix composed of a vector $\bullet$, $\omega_{nbk}{}^b = \omega_{ibk}{}^b - (C_{bk-1}{}^n)^T(\omega_{iek-1}{}^n + \omega_{enk-1}{}^n)$, where $\omega_{ib}{}^b$ represents an angular speed measurement from a gyroscope, $\omega_{iek}{}^n = [0 \; \omega_{ie} \cos$ $L_k \omega_{ie} \sin L_k]^T$, where $\omega_{ie}$ is an angular speed of Earth's rotation, L represents a latitude, and $$\omega_{enk}^n = \left[-\frac{v_{Nk}^n}{R_M+h_k} \quad \frac{v_{Ek}^n}{R_N+h_k} \quad \frac{v_{En}^n \tan L_k}{R_N+h_k}\right]^T,$$

where $V_N$ and $V_E$ respectively represent a northward speed and an eastward speed, $R_M$ and $R_N$ are respectively a radius of a meridian of the Earth in a locality and a radius of a prime vertical, h is a height, and k=1, 2, 3, . . . .

A forward speed updating process is:
$v_n^k = v_{k-1}^n + T_s[C_{bk-1}^n f_{sfk}^b - (2\omega_{iek-1}^n + \omega_{enk-1}^n) \times v_{k-1}^n + g^n]$
where $v^n = [v_E^n \ v_N^n \ v_U^n]^T$ represents a speed, $v_U$ represents an upward speed, $f_{sf}^b$ represents a specific force measurement from an accelerometer, and $g^n$ represents gravitational acceleration.

A forward position updating process is:

$$L_k = L_{k-1} + \frac{T_s v_{Nk-1}^n}{R_M+h_{k-1}} \lambda_k = \lambda_{k-1} + \frac{T_s v_{Ek-1}^n \sec L_{k-1}}{R_N+h_{k-1}}, h_k = h_{k-1} + T_s v_{Uk-1}^n,$$

where $\lambda$ represents a longitude.

Step 3: Perform a Reverse Navigation Calculation Process.

A reverse navigation process includes updating a posture, a speed, and a position, and specifically: a reverse posture updating process is:

$C_{bk-1}^n = C_{bk}^n (I + T_s \tilde{\Omega}_{nbk-1}^b)$ where $\tilde{\Omega}_{nbk-1}^b = -\Omega_{nbk}[I + T_s \Omega_{nbk}]^{-1}$;

a reverse speed updating process is:

$-v_{k-1}^n = -v_k^n + T_s \tilde{a}_{k-1,k}^n$, where $\tilde{a}_{k-1,k}^n = a_{k,k-1}^n = C_{bk-1}^n f_{sfk}^b - (2\omega_{iek-1}^n + \omega_{enk-1}^n) \times v_{k-1}^n + g^n$;

by defining ← as a way to represent a reverse direction, parameters in the reverse processes are obtained as follows: $\bar{C}_{bm-j}^n = C_{bj}^n$, $\ddot{\bar{v}}_{m-j}^n = -v_j^n$, $\bar{L}_{m-j} = L_j$, $\bar{\lambda}_{m-j} = \lambda_j$, $\bar{h}_{m-j} = h_j$, $\bar{f}_{sfm-j}^n = f_{sfj}^n$, $\bar{\bar{a}}_{k-1,k}^n = a_{k,k-1}^n$, $\bar{\omega}_{iem-j}^n = -\omega_{iej}^n$, $\bar{\omega}_{enm-j}^n = -\omega_{enj}^n$, and $\ddot{\bar{\Omega}}_{nbm-j}^b = \tilde{\Omega}_{nbj}^b$, further let p=m−k+1, and the following subscript conversions occur:

$C_{bk-1}^n = C_{bm-p}^n = \bar{C}_{bp}^n C_{bk}^n = C_{bm+1-p}^n = \bar{C}_{bp-1}^n$,
$\tilde{\Omega}_{nbk-1}^n = \tilde{\bar{\Omega}}_{nbp}^b$, and therefore the reverse posture updating is written as:

$\bar{C}_{bp}^n = \bar{C}_{bp-1}^n (I + T_s \tilde{\bar{\Omega}}_{nbp}^b)$ the reverse speed updating is written as:

$\ddot{\bar{v}}_p^n = \ddot{\bar{v}}_{p-1}^n + T_s \ddot{\bar{a}}_{p-1,p}$ the reverse position updating is written as:

$$\bar{L}_p = \bar{L}_{p-1} + \frac{T_s \bar{v}_{Np-1}^n}{R_M + \bar{h}_{p-1}} \bar{\lambda}_p = \bar{\lambda}_{p-1} + \frac{T_s \bar{v}_{Ep-1}^n \sec \bar{L}_{p-1}}{R_N + \bar{h}_{p-1}}, \bar{h}_p = \bar{h}_{p-1} + T_s \bar{v}_{Up-1}^n.$$

Step 4: Perform Adaptive Control for the Number of Forward and Reverse Calculations.

The adaptive control is performed for the number of forward and reverse calculations within a period of time through the control function $$q_i = \alpha \frac{m}{t_i},$$

where $q_i$ represents the number of forward and reverse calculations, and after the forward and reverse navigation calculations within the period of time are completed, a final result value is used as an initial value of a next stage, which is repeatedly performed until the alignment process is completed.

Further, α is 50, and a duration of each stage is 30-60 s.

Compared with the prior art, the present invention has the following advantages and beneficial effects:

1. The present invention shortens an alignment time for optimal estimation of fine alignment while ensuring an alignment accuracy. The method provided in the present invention can effectively solve the problem that an error of an initial value of filtering in an initial stage of the optimal estimation of fine alignment affects convergence speeds of subsequent stages. In the initial stage, a larger number of forward and reverse navigation calculations are adopted to reduce the error of the initial value as much as possible and increase a convergence speed of the filtering. In the subsequent stages, the number of forward and reverse calculations is gradually decreased as the accuracy of the filtering is continuously improved.

2. Since the reverse calculations are strict reverse processes, approximation errors are effectively avoided, and the error is not increased even after a plurality of forward and reverse calculations, thus quickly reducing the error of the initial value and accelerating convergence in the subsequent stages.

3. The present invention adaptively controls the number of forward and reverse navigation calculations, which can control the amount of calculations while ensuring a better basic accuracy and shorter alignment time, and bring faster response speed and better system performance to a navigation system through effective control of the amount of calculations.

BRIEF DESCRIPTION OF THE DRAWINGS

FIGURE is a schematic flowchart of a strict reverse navigation method for optimal estimation of fine alignment according to the present invention.

DETAILED DESCRIPTION OF THE EMBODIMENTS

The following describes the technical solutions provided in the present invention in detail with reference to specific embodiments. It should be understood that the following specific implementations are merely intended to describe the present invention rather than to limit the scope of the present invention.

According to a strict reverse navigation method for optimal estimation of fine alignment provided in the present invention, in an initial stage of the optimal estimation of fine alignment, a coarse initial value may slow down convergence, and therefore a large number of forward and reverse calculations is required in the initial period to reduce errors of the initial value and accelerate subsequent convergence. After the forward and reverse calculations in this stage are completed, a result is used as an initial value of a next stage, and the forward and reverse navigation calculations are continued. As time goes by, the navigation accuracy is continuously improved, and the number of forward and reverse calculations is also decreased. According to the method, it is assumed that moments of the whole discretization is from $t_1$ to $t_n$, and a standard forward navigation algorithm is divided into updating a posture, a speed, and a position of a strap-down inertial navigation system, and a strict reverse navigation algorithm is transposition and processing based on the forward algorithm, that is, the postures, the speeds, and the positions from $t_k$ to $t_1$ are updated. Specifically, as shown in the FIGURE, the method of the present invention includes the following steps.

Step 1: Establish an Adaptive Control Function.

A total sampling (alignment) time is denoted as m, time periods in a sampling process are denoted as a sequence $t_1$, $t_2$, $t_3$, ..., and a number of forward and reverse calculations in each of the time periods is denoted as $q_1$, $q_2$, $q_3$, ..., and it is found that a relationship between the sampling time and the number of forward and reverse calculations can better fit an inversely proportional relationship through observation, and therefore the control function expression is denoted as:

$$q_i = \alpha \frac{m}{t_i}, i \in [1, k],$$

where $\alpha$ is a control coefficient for a number of times, which is determined by a computer main frequency. Using 2.5 GHz as an example, $\alpha$ may be 50. From the expression of the control function, it can be seen that $q_i$ is decreased from fast to slow as $t_i$ is continuously increased. This means that as time goes by, the number of forward and reverse calculations is gradually decreased. Since in an initial stage of the optimal estimation of fine alignment, a coarse initial value may slow down convergence, and therefore a large number of forward and reverse calculations is required in the initial period to reduce the error of the initial value and accelerate subsequent convergence. As the alignment accuracy is improved, the number of forward and reverse calculations is gradually decreased. In addition, it should be noted that the calculation accuracy of each stage of $t_1$, $t_2$, $t_3$, ... is to be used as the initial value of a next stage to continue the iterative calculation, which can greatly accelerate convergence. $t_i$ is selected depending on the actual scene. A duration of each stage is generally 30-60 s.

Step 2: Perform a Forward Navigation Calculation Process.

A forward navigation process includes updating a posture, a speed, and a position, and specifically: an earth-centered inertial coordinate system is denoted as a system i, a terrestrial coordinate system is denoted as a system e, an east, north, up (ENU) coordinate system is selected as a navigation coordinate system and is denoted as a system n, and a vehicle coordinate system is denoted as a system b.

A forward posture updating process is: $C_{bk}{}^n = C_{bk-1}{}^n(I + T_s \Omega_{nbk}{}^b)$, where $C_b{}^n$ is a posture matrix, $T_s$ is a sampling period of a strap-down inertial navigation system, $\Omega_{nbk}{}^b = (\omega_{nbk}{}^n \times)$, where (●×) represents an antisymmetric matrix composed of a vector ●, $\omega_{nbk}{}^b = \omega_{ibk}{}^b - (C_{bk-1}{}^n)^T(\omega_{iek-1}{}^n + \omega_{enk-1}{}^n)$, where $\omega_{ib}{}^b$ represents an angular speed measurement from a gyroscope, $\omega_{iek}{}^n[0 \omega_{ie} \cos L_k \omega_{ie} \sin L_k]^T$, where $\omega_{ie}$ is an angular speed of Earth's rotation, L represents a latitude, and $$\omega_{enk}^n = \left[ -\frac{v_{Nk}^n}{R_M + h_k} \quad \frac{v_{Ek}^n}{R_N + h_k} \quad \frac{v_{En}^n \tan L_k}{R_N + h_k} \right]^T,$$

where VN and VE respectively represent a northward speed and an eastward speed, $R_M$ and $R_N$ are respectively a radius of a meridian of the Earth in a locality and a radius of a prime vertical, h is a height, and k=1, 2, 3, .... A forward speed updating process is: $v_k{}^n = v_{k-1}{}^n + T_s[C_{bk-1}{}^n f_{sfk}{}^b - (2\omega_{iek-1}{}^n + \omega_{enk-1}{}^n) \times v_{k-1}{}^n + g^n]$, where $v^n = [v_E{}^n v_N{}^n v_U{}^n]^T$ represents a speed, $v^U$ represents an upward speed, $f_{sf}{}^b$ represents a specific force measurement from an accelerometer, and $g^n$ represents gravitational acceleration.

A forward position updating process is:

$$L_k = L_{k-1} + \frac{T_s v_{Nk-1}^n}{R_M + h_{k-1}}, \lambda_k = \lambda_{k-1} + \frac{T_s v_{Ek-1}^n \sec L_{k-1}}{R_N + h_{k-1}},$$

$h_k = h_{k-1} + T_s v_{Uk-1}{}^n$, where $\lambda$ represents a longitude.

Step 3: Perform a Reverse Navigation Calculation Process.

The present invention derives the strict reverse navigation process, and specifically:

a reverse posture updating process is:

$$C_{bk-1}{}^n = C_{bk}{}^n(I + T_s + \tilde{\Omega}_{nbk-1}{}^b) \text{ where } \tilde{\Omega}_{nbk-1}{}^b = -\Omega_{nbk}[I + T_s \Omega_{nbk}]^{-1};$$

a reverse speed updating process is:

$$-v_{k-1}{}^n = -v_k{}^n + T_s \tilde{a}_{k-1,k}{}^n, \text{ where } \tilde{a}_{k-1,k}{}^n = a_{k,k-1}{}^n = C_{bk-1}{}^n f_{sfk}{}^b - (2\omega_{iek-1}{}^n + \omega_{enk-1}{}^n) \times v_{k-1}{}^n + g^n;$$

by defining ← as a way to represent a reverse direction, parameters in the reverse processes are obtained as follows: $\bar{C}_{bm-j}{}^n = C_{bj}{}^n$, $\bar{\bar{v}}_{m-j}{}^n = -v_j{}^n$, $\bar{L}_{m-j} = L_j$, $\bar{\lambda}_{m-j} = \lambda_j$, $\bar{h}_{m-j} = h_j$, $\bar{f}_{sfm-j}{}^n = f_{sfj}{}^n$, $\bar{\bar{a}}_{k-1,k}{}^n = a_{k,k-1}{}^n$, $\bar{\omega}_{iem-j}{}^n = -\omega_{iej}{}^n$, $\bar{\omega}_{enm-j}{}^n = -\omega_{enj}{}^n$, and $\bar{\dot{\Omega}}_{nbm-j}{}^b = \tilde{\Omega}_{nbj}{}^b$, further let p=m-k+1, and the following subscript conversions occur:

$C_{bk-1}{}^n = C_{bm-p}{}^n = \bar{C}_{bp}{}^n C_{bk}{}^n = C_{bm+1-p}{}^n = \bar{C}_{bp-1}{}^n$, and $\tilde{\Omega}_{nbk-1}{}^b = \bar{\dot{\Omega}}_{nbp}{}^b$, and therefore the reverse posture updating is written as:

$$\bar{C}_{bp}{}^n = \bar{C}_{bp-1}{}^n(I + T_s \bar{\dot{\Omega}}_{nbp}{}^b)$$

the reverse speed updating is written as:

$$\bar{\bar{v}}_p{}^n = \bar{\bar{v}}_{p-1}{}^n + T_s \bar{\bar{a}}_{p-1,p}$$

the reverse position updating is written as:

$$\bar{L}_p = \bar{L}_{p-1} + \frac{T_s \bar{v}_{Np-1}^n}{R_M + \bar{h}_{p-1}}, \bar{\lambda}_p = \bar{\lambda}_{p-1} + \frac{T_s \bar{v}_{Ep-1}^n \sec \bar{L}_{p-1}}{R_N + \bar{h}_{p-1}},$$

and $\bar{h}_p = \bar{h}_{p-1} + T_s \bar{v}_{Up-1}^n$.

By intuitively comparing the forward and reverse navigation algorithms, it can be found that representation forms of the algorithms are consistent. The items that need to be changed include taking an inverse of a sign of the angular speed of Earth's rotation, an antisymmetric matrix of an angular speed is obtained from a virtual gyro, and reverse processing is finally performed on the sampled data to achieve the strict reverse navigation calculation from $t_k$ to $t_1$.

Step 4: Perform Adaptive Control for the Number of Forward and Reverse Calculations.

The number of forward and reverse calculations within a time period is adaptively controlled via the current alignment time. The control function is $$q_i = \alpha \frac{m}{t_i}, i \in [1, k],$$

where $q_i$ represents the number of forward and reverse calculations, and α is a control coefficient determined by a computer main frequency. Using 2.5 GHz as an example, α may be 50, m is the total sampling (alignment) time, and $t_1$ represents the current time stage. After the forward and reverse navigation calculations within the period of time are completed, a final result value is used as an initial value of a next stage, which is repeatedly performed until the alignment process is completed.

According to the method of the present invention, forward and reverse navigation calculations are performed based on the sampled data of the gyroscope and accelerometer in the strap-down inertial navigation system. By virtue of powerful navigation computer storage capabilities and calculation capabilities, the reverse navigation algorithm implements processing of the sampled data in reversed order. Further, repeated forward and reverse analysis are performed on stored sampled data in a time period can effectively improve the accuracy of analysis. The reverse navigation algorithm in the present invention adopts strict reverse derivation, and there is no approximate error of the repeated forward and reverse navigation calculation process, so that the alignment accuracy of the algorithm can be guaranteed. The present invention adaptively controls the number of forward and reverse calculations in different stages. In the initial stage of the optimal estimation of fine alignment, the selection of the initial filter value generally affects a convergence speed of the filtering, and the coarse initial value may slow down the convergence. Therefore, a large number of forward and reverse calculations are performed in the initial time period to ensure the accuracy of the initial value, and the results in the time period are used as the initial value of the next stage to continue the forward and reverse calculations. The accuracy is continuously improved as time goes by, the number of forward and reverse calculations is accordingly decreased, and the process is completed when the requirements for the alignment accuracy are satisfied. The method provided in the present invention is applicable to the optimal estimation of fine alignment process, and the amount of calculations and the alignment time are reduced as much as possible while ensuring the final alignment accuracy.

The technical means disclosed in the solutions of the present invention are not limited to the technical means disclosed in the foregoing implementations, and also includes technical solutions including any combination of the foregoing technical features. It should be noted that a person of ordinary skill in the art may make several improvements and modifications without departing from the principle of the present invention. All such modifications and modifications shall fall within the protection scope of the present invention.

What is claimed is:

1. A strict reverse navigation method for an optimal estimation of a fine alignment to initialize a navigation system, wherein the navigation system comprises a computer and a gyroscope, and wherein the strict reverse navigation method is performed by the navigation system and comprising the following steps:

step 1: establishing, by the computer, an adaptive control function, wherein a total sampling time is denoted as m, time periods in a sampling process are denoted as a sequence $t_1$, $t_2$, $t_3$, ..., a number of forward and reverse calculations in each of the time periods is denoted as $q_1$, $q_2$, $q_3$, ..., and an expression of the adaptive control function is denoted as:

$$q_i = \alpha \frac{m}{t_i},$$

i∈[1, k], wherein α is a control coefficient for a number of times determined by a main frequency of the computer;

step 2: obtaining, by the computer, measurements from the gyroscope, and performing, by the computer, a forward navigation calculation process, wherein a forward navigation process comprises updating a posture, a speed, and a position, and specifically: an earth-centered inertial coordinate system is denoted as a system i, a terrestrial coordinate system is denoted as a system e, an east, north, up (ENU) coordinate system is selected as a navigation coordinate system and is denoted as a system n, and a vehicle coordinate system is denoted as a system b;

a forward posture updating process is:

$$C_{bk}{}^n = C_{bk-1}{}^n (I + T_s \Omega_{nbk}{}^b),$$

wherein $C_b{}^n$ is a posture matrix, $T_s$ is a sampling period of a strap-down inertial navigation system, $\Omega_{nbk}{}^b = (\omega_{nbk}{}^n \times)$ wherein (●×) represents an antisymmetric matrix composed of a vector ●, $\omega_{nbk}{}^b = \omega_{ibk}{}^b - (C_{bk-1}{}^n)^T (\omega_{iek-1}{}^n + \omega_{enk-1}{}^n)$, wherein $\omega_{ib}{}^b$ represents an angular speed measurement from the gyroscope, $\omega_{iek}{}^n = [0 \ \omega_{ie} \cos L_k \ \omega_{ie} \sin L_k]^T$, wherein $\omega_{ie}$ is an angular speed of Earth's rotation, L represents a latitude, and $$\omega_{enk}^n = \left[ -\frac{v_{Nk}^n}{R_M + h_k} \ \frac{v_{Ek}^n}{R_N + h_k} \ \frac{v_{En}^n \tan L_k}{R_N + h_k} \right]^T,$$

wherein $V_N$ and $V_E$ respectively represent a northward speed and an eastward speed, $R_M$ and $R_N$ are respectively a radius of a meridian of the Earth in a locality and a radius of a prime vertical, h is a height, and k=1, 2, 3, ...;

a forward speed updating process is:

$$v_k{}^n = v_{k-1}{}^n + T_s[C_{bk-1}{}^n f_{sf}{}^b - (2\omega_{iek-1}{}^n + \omega_{enk-1}{}^n) \times v_{k-1}{}^n + g^n],$$

wherein $v^n = [v_E{}^n \ v_N{}^n \ v_U{}^n]^T$ represents a speed, $v_U$ represents an upward speed, $f_{sf}{}^b$ represents a specific force measurement from an accelerometer, and $g^n$ represents a gravitational acceleration;

a forward position updating process is:

$$L_k = L_{k-1} + \frac{T_s v_{Nk-1}^n}{R_M + h_{k-1}},$$

$$\lambda_k = \lambda_{k-1} + \frac{T_s v_{Ek-1}^n \sec L_{k-1}}{R_N + h_{k-1}},$$

$$h_k = h_{k-1} + T_s v_{Uk-1}^n,$$

wherein λ represents a longitude;

step 3: performing, by the computer, a reverse navigation calculation process, wherein a reverse navigation process comprises updating the posture, the speed, and the position, and specifically:

a reverse posture updating process is:

$$C_{bk-1}^n = C_{bk}^n(I + T_s \tilde{\Omega}_{nbk-1}^b) \text{ wherein } \tilde{\Omega}_{nbk-1}^b = -\Omega_{nbk}[I + T_s \Omega_{nbk}]^{-1};$$

a reverse speed updating process is:

$$-v_{k-1}^n = -v_k^n + T_s \tilde{a}_{k-1,k}^n, \text{ wherein } \tilde{a}_{k-1,k}^n = a_{k,k-1}^n = C_{bk-1}^n f_{sfk}^b - (2\omega_{iek-1}^n + \omega_{enk-1}^n) \times v_{k-1}^n + g^n;$$

by defining ← as a way to represent a reverse direction, parameters in the reverse posture updating process and the reverse speed updating process are obtained as follows: $\bar{C}_{bm-j}^n = C_{bj}^n$, $\ddot{\bar{v}}_{m-j}^n = -v_j^n$, $\overleftarrow{L}_{m-j} = L_j$, $\overleftarrow{\lambda}_{m-j} = \lambda_j$, $\overleftarrow{h}_{m-j} = h_j$, $\bar{f}_{sfm-j}^n = f_{sfj}^n$, $\bar{\bar{a}}_{k-1,k}^n = a_{k,k-1}^n$, $\bar{\omega}_{iem-j}^n = -\omega_{iej}^n$, $\bar{\omega}_{enm-j}^n = -\omega_{enj}^n$, and $\bar{\tilde{\Omega}}_{nbm-j}^b = \tilde{\Omega}_{nbj}^b$, and further let p=m-k+1, and the following subscript conversions occur:

$$C_{bk-1}^n = C_{bm-p}^n = \bar{C}_{bp}^n,$$

$$C_{bk}^n = C_{bm+1-p}^n = \bar{C}_{bp-1}^n, \text{ and}$$

$$\tilde{\Omega}_{nbk-1}^b = \bar{\tilde{\Omega}}_{nbp}^b, \text{ and therefore}$$

the reverse posture updating process is written as:

$$\bar{C}_{bp}^n = \bar{C}_{bp-1}^n(I + T_s \bar{\tilde{\Omega}}_{nbp}^b),$$

the reverse speed updating process is written as:

$$\ddot{\bar{v}}_p^n = \ddot{\bar{v}}_{p-1}^n + T_s \bar{\bar{a}}_{p-1,p},$$

the reverse position updating process is written as:

$$\overleftarrow{L}_p = \overleftarrow{L}_{p-1} + \frac{T_s \vec{v}_{Np-1}^n}{R_M + \overleftarrow{h}_{p-1}},$$

-continued $$\overleftarrow{\lambda}_p = \overleftarrow{\lambda}_{p-1} + \frac{T_s \vec{v}_{Ep-1}^n \sec \overleftarrow{L}_{p-1}}{R_N + \overleftarrow{h}_{p-1}},$$

$$\overleftarrow{h}_p = \overleftarrow{h}_{p-1} + T_s \vec{v}_{Up-1}^n;$$

step 4: performing, by the computer, an adaptive control for the number of the forward and reverse calculations, wherein the adaptive control is performed for the number of the forward and reverse calculations within a period of time through the adaptive control function $$q_i = \alpha \frac{m}{t_i},$$

wherein $q_i$ represents the number of the forward and reverse calculations, and after the forward and reverse calculations within the period of time are completed, a final result value is used as an initial value of a next stage, which is repeatedly performed until the fine alignment of the navigation system is completed;

step 5: initializing the navigation system by aligning the navigation system using the optimal estimation of the fine alignment.

2. The strict reverse navigation method according to claim 1, wherein α is 50, and α duration of each stage is 30-60 s.

3. The strict reverse navigation method according to claim 1, wherein steps 1-5 are performed by the navigation system while the navigation system is on a moving base on a water surface or underwater.

\* \* \* \* \*